US007606895B1

(12) United States Patent
Dini et al.

(10) Patent No.: US 7,606,895 B1
(45) Date of Patent: Oct. 20, 2009

(54) METHOD AND APPARATUS FOR COLLECTING NETWORK PERFORMANCE DATA

(75) Inventors: Petre Dini, San Jose, CA (US); Masum Z. Hasan, San Jose, CA (US); Kurella Murty, San Jose, CA (US); Kui Zhang, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 773 days.

(21) Appl. No.: 10/900,900

(22) Filed: Jul. 27, 2004

(51) Int. Cl.
 *G06F 15/173* (2006.01)
(52) U.S. Cl. .................................. 709/224; 709/223
(58) Field of Classification Search ................ 709/224, 709/223
 See application file for complete search history.

(56) References Cited

U.S. PATENT DOCUMENTS

| 6,633,835 | B1* | 10/2003 | Moran et al. ................ 702/190 |
| 6,983,317 | B1* | 1/2006 | Bishop et al. ............... 709/223 |
| 2001/0021176 | A1* | 9/2001 | Mimura et al. .............. 370/235 |
| 2003/0135474 | A1* | 7/2003 | Circenis et al. ............. 705/400 |
| 2003/0163559 | A1* | 8/2003 | Dini .......................... 709/223 |

OTHER PUBLICATIONS

Chen et al., "Internet performance monitoring", Proceedings of the IEEE vol. 90, Issue 9, Sep. 2002 pp. 1592-1603.*
Caruso, R.E., "Network management: a tutorial overview", Communications Magazine, IEEE vol. 28, Issue 3, Mar. 1990 pp. 20-25.*
Boutaba et al., "An outlook on intranet management", Communications Magazine, IEEE vol. 35, Issue 10, Oct. 1997 pp. 92-99.*
Appleby et al., "Oceano-SLA based management of a computing utility", Integrated Network Management Proceedings, 2001 IEEE/IFIP International Symposium on May 14-18, 2001 pp. 855-868.*
Amdocs, "Amdocs Service Mediation Manager 6" Amdocs, Jun. 2005, retrieved from the internet at <http://www.amdocs.com/products.asp?SID=633&ID=632>, 6 pages.
Dini, Petre et al., "Policy-enabled mechanisms for feature interactions: reality, expectations, challenges," Computer Networks, 2904, Mar. 20, 2004, 19 pages.
Narus, "Narus Corporate Overview," retrieved from the internet at <http://www.narus.com/_pdf/NarusBackgrounder.pdf>, 2 pages.

* cited by examiner

*Primary Examiner*—Vivek Srivastava
*Assistant Examiner*—William J Goodchild
(74) *Attorney, Agent, or Firm*—Hickman Palermo Truong & Becker LLP

(57) ABSTRACT

A method of managing performance data and accounting data that are generated in a computer network comprises collecting performance data from the network using one or more collector blades that are installed into a data collection manager at a time when the data collection manager is executed; determining whether the performance data satisfies one or more thresholding rules, and if so, generating and sending one or more performance messages; filtering the performance data using one or more filters; aggregating the performance data; and correlating the performance data with other data received from one or more network management subsystems.

30 Claims, 5 Drawing Sheets

METHOD AND APPARATUS FOR COLLECTING NETWORK PERFORMANCE DATA

FIELD OF THE INVENTION

The present invention generally relates to management of computer networks. The invention relates more specifically to processing network performance information useful in network management.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Numerous techniques, products, and supporting tools have been developed for monitoring and managing the behavior of network devices and networks as a whole. In general, existing management products provide separate network fault, configuration, accounting, performance, and security ("FCAPS") management functions. Most products that are designed to receive, process and drive distributed information on performance or accounting data, such as products available from Agilent, Narus, XACCT, Cisco, Concord, and Infovista, use a hard-coded software structure, and cannot operate with a mixture of native and non-native processing algorithms. Moreover, these systems are not equipped with features to self-administrate both their structure and their operational functions. Their interfaces are purely devoted to input and output of monitored data; they have no capability for dynamically importing policies to control the collection and the processing of state information on the network devices.

Thus, there is a need for adaptable tools that are capable of optimizing both the collection and processing of behavioral information on the network. There is a need for products that can flexibly accept new features for both input and output functions, and that permit integration of new software elements into their structure and new functions into their behavior, as business needs evolve.

Good network management often requires concurrent consideration of network accounting information and network performance information. However, the separation of accounting and performance data collection in most systems means that managers have difficulty in synchronizing the information provided by distinct tools dealing with performance and accounting.

Moreover, there is a need to dynamically verify the compatibility between different types of network data collectors or between policy sets that drive business-oriented settings. Therefore, there is a need of to have self-manageable tools for processing accounting and performance data on networks. There is also a need for network management data collection systems with the possibility to dynamically tune their monitoring behavior and monitor their structure.

Still another drawback of existing network management data collection systems is that they provide relatively simple data processing, typically limited to aggregation functions, and processing of partial or incomplete data is not considered. This becomes a serious limitation on performing pre-emptive diagnosis, in which only partial data is available. While the polling mechanisms of systems from Agilent, Concord and Infovista are programmable, they are not self-adaptable. As a result, external decisions are needed to modify or tune the settings of the polling mechanisms. There is no intelligence embedded into the processes handling those collectors, and therefore no optimization is performed in collection of data.

The existing tools also do not dynamically provide policies to reschedule all collection and processing features, while checking and validating consistencies between the active collectors and conflict free policy blades driving the operational functions and self-administrative functions. An example of a self-administrative function is dynamically verifying that no conflicting policies are simultaneously active.

Based on the foregoing, there is a clear need for improved ways to simultaneously manage network performance and accounting information.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for managing performance data and accounting data that are generated in a computer network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Managing Performance Data and Accounting Data That Are Generated in a Computer Network
    3.1 Network Context
    3.2 Processing Performance and Accounting Data
    3.3 Performance Engine Implementation
    3.4 Use Of Dynamically Installed Policies to Control Performance and Accounting Data Collection
    3.5 Implementation of Policies as Managed Objects
    3.6 Implementation Example
4.0 Implementation Mechanisms-Hardware Overview
5.0 Extensions and Alternatives

1.0 GENERAL OVERVIEW

The needs identified in the foregoing Background, and other needs and objects that will become apparent for the_ following description, are achieved in the present invention, which comprises, in one aspect, a method for managing performance data and accounting data that are generated in a computer network, and comprises collecting performance data from the network using one or more collector blades that can be installed into a data collection manager at a time when the data collection manager is executed; determining whether the performance data satisfies one or more thresholding rules, and if so, generating and sending one or more performance messages; filtering the performance data using one or more filters; aggregating the performance data; and correlating the performance data with other data received from one or more network management subsystems.

According to one feature, one or more of the collector blades comprise generic management information base (MIB) collectors that collect performance data accessible in a similar way, and one or more of the collector blades are specialized collectors. In another feature, the method further comprises the steps of providing a collector blade interface in the data collection manager; receiving information identifying one or more collector blades; and determining a collector type associated with each of the collector blades. In a related feature, each of the collector blades comprises information identifying a source of data for collection, frequency of collection, destination of collected data, and a processing type to apply to the collected data.

According to another feature, collecting performance data further comprises polling one or more network elements in the network to obtain the performance data, according to an adaptive polling frequency, wherein the adaptive polling frequency is determined based on one or more rates of change in the performance data, wherein the rates of change are determined based on one or more dependencies among components of the network elements.

In yet another feature, each of the thresholding rules specifies a condition associated with a variable for either a particular data parameter or a set of events that may occur among components of elements of the networks.

In still another feature, the filters are installed into the data collection manager at the time when the data collection manager is executed.

In still another feature, aggregation further comprises the step of polling one or more network elements in the network to provide missing information needed to finalize a specified aggregation pattern. In a related feature, aggregation further comprises the steps of determining a context associated with the performance data, and removing data that is redundant or not germane to a specified context.

In yet another feature, the network management subsystems comprise performance, fault, accounting, or security subsystems. Further, the thresholding rules, filtering, aggregating, and correlating may be performed according to one or more policies that are installed into the data collection manager at a time when the data collection manager is executed.

In other aspects, the invention encompasses a computer apparatus and a computer-readable medium configured to carry out the foregoing steps.

2.0 STRUCTURAL AND FUNCTIONAL OVERVIEW

A method for managing performance data and accounting data that are generated in a computer network and a network performance engine as described herein provide for self-managing performance and accounting data collection and processing, while using, in certain embodiments, the concepts of policy-blades, collector-blades and a policy-kernel.

Additionally, the method and engine provide mechanisms for adaptable and optimized polling and aggregation for incomplete data, and these mechanisms have particular applicability to network problem diagnosis. In general, performance data relates to the availability, response time, accuracy, and service level violations associated with one or more network elements or a managed network as a whole. Accounting data refers to usage, outage, SLA or quality of service (QoS) violations, and billing values associated with one or more network elements or the managed network as a whole.

A performance engine as disclosed herein can perform data measurement or thresholding, data collection through polling or detection of spontaneous events, data processing including filtering, aggregation, normalization, etc., and data reporting directly to external applications or indirectly through an operational support system (OSS) or other external system. The information collected and processed by the performance engine may be used for any of various purposes, including diagnostic functions, troubleshooting, SLA/QoS evaluation, intrusion detection through performance and/or accounting data, graceful performance degradation, traffic rating, usage rating, outage rating, availability-based selection servers, root cause analysis for performance degradation or accounting events, impact analysis, and customer impact analysis (e.g., determining the number of VPN clients affected by a service failure).

The combination of steps, elements and mechanisms provided in the method and engine offer provide features not found in prior systems, including self-inventorying of collectors, filters, and policies; dynamic functional correlation of installed system elements; and features that are adaptable, capable of packaging, and capable of upgrading.

According to one embodiment, a performance engine is a specialized software element that collects and processes performance and accounting data and implements new processing techniques not found in prior systems. According to certain embodiments, a dynamically extendable collector-blade and policy-blade packaging architecture are provided. Special collection techniques may be used based on a role played by one or more specified components of network elements in the managed network. The performance engine provides support for adaptable and optimized polling mechanisms. Role-oriented data filtering techniques are provided. Context-based data aggregation is provided, including techniques for handling partially useful information and collecting missing information using special poll requests. A policy-kernel manages and controls functions of the performance engine, including the policy-blades. Specialized functional, management, and decisional interfaces are provided to enable integration with other systems.

The use of a policy-kernel allows correlation policies to be run in the same decisional space as a performance data collector and accounting data collector. As an example, when the number of refused attempts to establish a call exceeds a given threshold, or when the number of packets on a given connection do not follow an allocated traffic pattern provided in a service level agreement, as indicated by accounting data, then performance collectors can be activated to collect performance data from target network elements. Further, filters can be tuned to pass only accounting information that is perceived as violation or abnormal.

The performance engine eliminates the complexity of access to performance and accounting data by providing an interface that is homogeneous and consistent even when the managed network is heterogeneous and complex. As a result, the manageability of performance data is improved. In particular, data management is improved for third-party applications addressing capacity planning, performance reporting, service level agreement (SLA) management and billing mediation or rating operations. These applications are commonly used by network service providers that manage large or complex networks.

The architecture can be data-driven in accordance with the policy instructions, or behavior-driven. In the behavior-driven approach, a policy is invoked when certain collected values exceed a given threshold. For example, a policy could be invoked when the number of SLA-related violations or the computed outage period within a given interval exceeds a given threshold.

In summary, according to one embodiment, an engine as disclosed herein provides a new performance and accounting system architecture featuring dynamically extensible collector-blades and policy-blades. The system provides special collection techniques based on the role played by the target network elements. The role is assumed to be associated to a network element and to be known by the collector. This allows using a generic collector set for accounting and quality of service (QoS) to activate only one collection facet. For example, for an edge router, both the number of received data octets ("InOctets") and QoS parameters may be relevant, whereas for a core router, accounting data is of primary interest. The architecture provides adaptable and optimized polling mechanisms. Context-based aggregation with techniques for handling partially useful information and collecting special missing information by request is supported. Specialized functional/management/decisional interfaces are supported.

The system provides a self-managing architecture for performance and accounting collection and processing. The system is self-managing in that the system handles itself at runtime the inventory of policy-blades and collector-blades, as well as their installation and activation. Collection of data is based on a variety of criteria prescribed through the policies. Processing operations are based on the nature of data collected and completeness of data collected. Adaptable processing techniques, such as adaptable polling and adaptable aggregation under inconsistent or incomplete data, are provided.

As a result, the techniques herein provide an efficient data collection interface that operates close to managed network elements and that hides the complexity of multi-component billing and performance data from third parties and customers.

3.0 MANAGING PERFORMANCE DATA AND ACCOUNTING DATA THAT ARE GENERATED IN A COMPUTER NETWORK

3.1 Network Context

Figure 1:
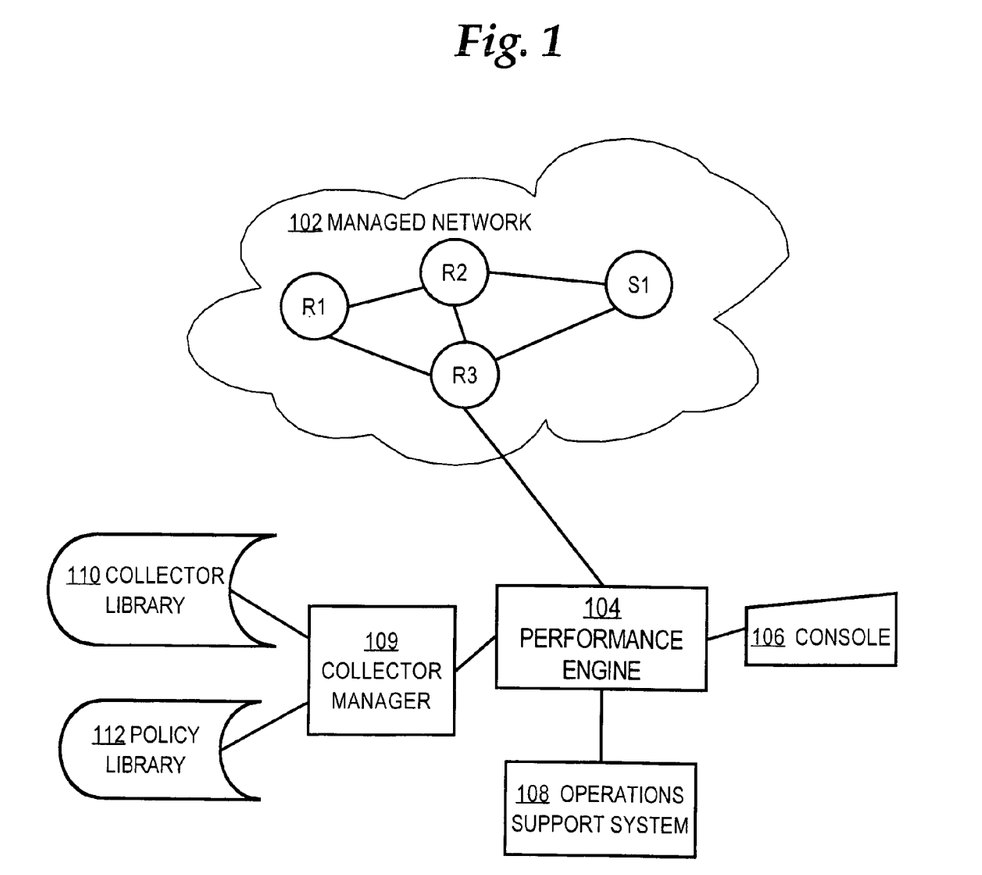
FIG. 1 is a block diagram of a computer network in which an embodiment may be used.

FIG. 1 is a block diagram of a computer network in which an embodiment may be used. A managed network 102 comprises network elements such as one or more routers R1, R2, R3 and switches S1. In a practical embodiment, managed network 102 may comprise any number of network elements. The managed network 102 is communicatively coupled to a performance engine 104. A management console 106 may be coupled, directly or indirectly through one or more networks or internetworks, to performance engine 104. Additionally or alternatively, performance engine may be interfaced to or integrated with an operation support system (OSS) 108.

In an alternative embodiment, one or more other instances of the performance engine 104 or other data processing engines may be communicatively coupled to the performance engine, for example, in a hierarchical relationship. In such an arrangement, the instances of the performance engine are operable upon either raw performance and/or accounting data, or upon data that has been processed by another instance of an engine at a higher hierarchical level. Further, in such an embodiment, the flow of data among engines at different hierarchical layers may be specified by appropriate policies in the engine instances or managed by a policy server.

3.2 Processing Performance and Accounting Data

Figure 2:
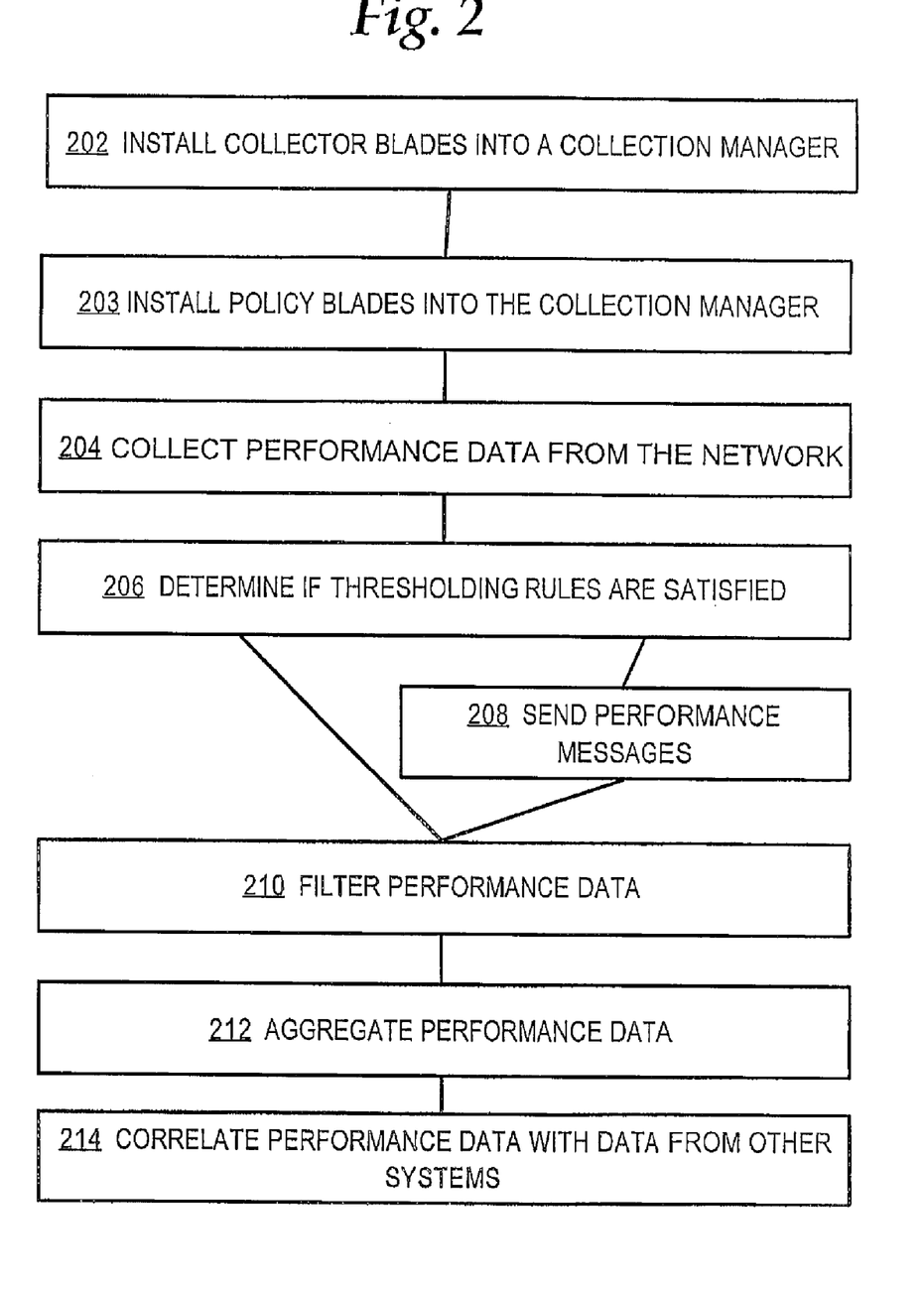
FIG. 2 is a flow diagram of one embodiment of a method for managing performance data and accounting data that are generated in a computer network.

FIG. 2 is a flow diagram of one embodiment of a method for managing performance data and accounting data that are generated in a computer network.

In step 202, one or more collector blades are installed into a collection manager. The collection manager may comprise a performance engine as described further herein in section 3.3. The collection manager is a software element that performs the functions shown in FIG. 2 and otherwise described herein. In step 203, one or more policy blades are installed into the collection manager. The nature and function of collector blades and policy blades, and dynamic run-time installation mechanisms, are described further herein.

In step 204, performance data is collected from the network using the collector blades.

In step 206, the data collection manager determines whether the performance data satisfies one or more thresholding rules. If so, one or more performance messages are generated and sent, as shown in step 208.

In step 210, the performance data is filtered using one or more filters. In step 212, the performance data is aggregated. In step 214, the performance data is correlated with other data received from one or more network management subsystems.

The collector blades that are installed at step 202 and used at step 204 may comprise either generic MIB collectors that collect performance data accessible in a similar way, or specialized collectors. To facilitate dynamic run-time installation of collector blades, the performance engine may provide a collector blade interface. At runtime, the interface receives a list of collector blades for installation, for example, from a configuration file. The interface determines whether each collector for installation is a generic collector or specialized collector. In one embodiment, each of the collector blades comprises information identifying a source of data for collection, frequency of collection, destination of collected data, and a processing type to apply to the collected data.

Collecting performance data at step 204 may further comprise polling one or more network elements in the network to obtain the performance data, according to an adaptive polling frequency. The adaptive polling frequency may be determined based on one or more rates of change in the performance data. The rates of change may be determined based on one or more dependencies among components of the network elements.

The thresholding rules used at step 206 may specify a condition associated with a variable for either a particular data parameter or a set of events that may occur among components of elements of the networks. The filters used at step 210 may be installed into the data collection manager at the time when the data collection manager is executed.

Further, in one embodiment, aggregation as performed at step 212 may further comprise polling one or more network elements in the network to provide missing information needed to finalize a specified aggregation pattern. The aggregation may further comprise the steps of determining a context associated with the performance data, and removing data that is redundant or not germane to a specified context.

In yet another feature, the network management subsystems that are correlated at step 214 comprise performance, fault, accounting, or security subsystems. The performance manager may evaluate the thresholding rules and perform the filtering, aggregating, and correlating according to one or more policies that are installed into the data collection manager at a time when the data collection manager is executed.

3.3 Performance Engine Implementation

Figure 3:
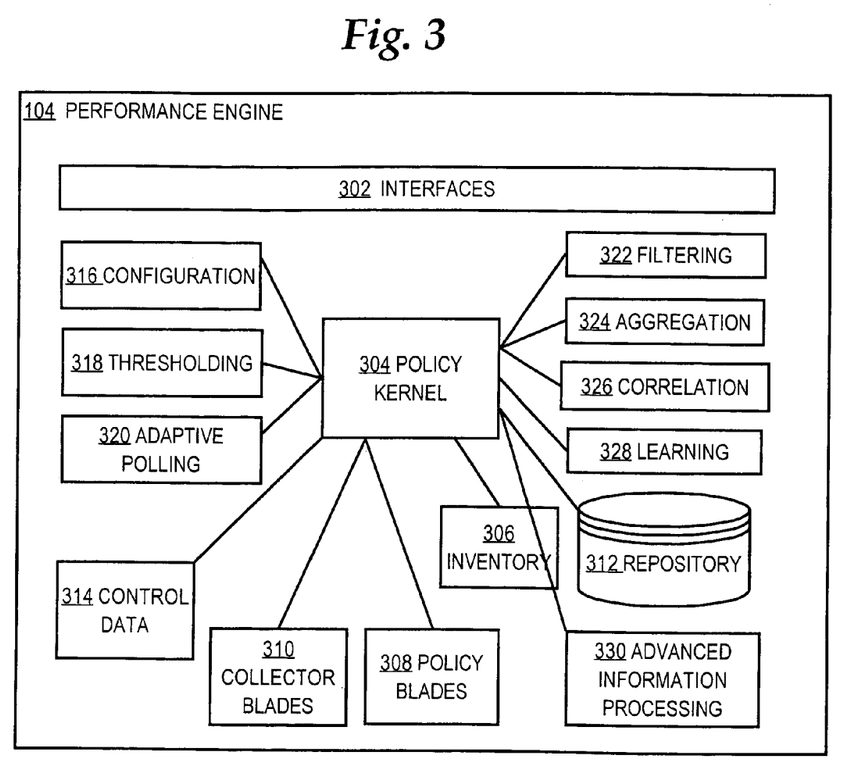
FIG. 3 is a block diagram showing a software architecture that may be used in an example embodiment of a performance engine.

FIG. 3 is a block diagram showing a software architecture that may be used in an example embodiment of a performance engine. According to one embodiment, a performance engine simplifies the collection, aggregation and forwarding of performance and usage data from a wide variety of network element types and data sources such as management information bases (MIBs), bulk MIB files, flat files, call history detail records, etc., according to policies that are programmed into the performance engine by higher-layer applications.

One or more interfaces 302 are coupled to a policy kernel 304. Interfaces 302 comprise a plurality of sub-interfaces that may be grouped by functionality as a functional interface, decisional interface, management interface, settings interface, and deployment interface. The decisional interface may comprise several sub-sub-interfaces such as structure policy-blades, functional policy-blades, and peer-interaction policy-blades.

The interfaces 302 enable other applications to provide information that enables the performance engine to support different types of data collections, implement particular use cases, and exchange data with various third party reporting tools. For example, in one embodiment, performance engine 104 provides operational interfaces, control interfaces, and management interfaces that applications may address with appropriate commands or data. The functional interface is used to output information from performance engine 104 to one or more OSS components that set policies represented in policy blades 308.

Policy blades 308 and collector blades 310 are coupled to the policy kernel 304. Thus, the policy kernel serves as a repository for installed policies. Using collector blades 310 or policy blades 308 installed at runtime, a network administrator may extend the performance engine 104 to support any device provided by any vendor. For example, management functions associated with particular types of network elements, and particular solution requirements, are performed by one or more policy blades that specify and execute the functions or requirements.

In one embodiment, collector blades 310 are configured in one of three categories depending on the source of the data with which the collectors operate. In this embodiment, a first type of collector is termed generic or common. Generic collectors collect performance data that is accessible in a similar way. In this case, the relationships between different tables and object groups are similar, and the information-mining path is the same. For example, generic or common collectors collect data from SNMP MIBs, Syslogs, CLI command strings, TL1 data, etc. Specialized or customized collectors form another category. For example, specialized collectors are used for bulk MIBs, MIBs having particular internal dependencies, AAA, flat files, and others. Finally, tailored collectors are configured to collect data required for the operation of specific OSS components, or to collect data from other instances of performance engine 104 that are managing other networks.

To enable the collector-blades 310 to be run-time-pluggable, policy kernel 304 provides a pluggable interface, and services to identify the collector type. At runtime, the identifying services update the structure of the policy kernel 304 to integrate the collector-blades 310. In an alternative embodiment, interfaces 302 provide a special function allowing new collectors to be packaged by request. For example, using a console command, an administrator can identify a collector-blade to performance engine 104 for integration while the performance engine is running.

According to one embodiment, each of the collector blades 310 comprises information defining how to collect data from the managed network. For example, information defining a collector-blade may comprise information identifying a source of data; frequency of collection; a destination to send collected data; and a processing type to perform, such as a simple collection of raw data, or a pre-processing function.

Control data 314, a configuration module 316, thresholding module 318, adaptive polling module 320, filtering module 322, aggregation module 324, correlation module 326, and learning module 328 are coupled to policy kernel 304. Configuration module 316 contains information for deploying services of the performance engine 104, including default configuration values and settings that govern its operation. For example, configuration module 316 defines the amount of storage that the performance engine 104 needs to operate, and other system requirements. With configuration module 316, the performance engine 104 is self-deploying. Further, control data 314 comprises data for external management of the performance engine 104, such as errors, traps, performance degradation information, etc.

Operational parameters of thresholding module 318, adaptive polling module 320, filtering module 322, aggregation module 324, correlation module 326, and learning module 328 may be defined in the policy blades 308 or their constituent policies. In this way, a particular policy blade 308 can adapt, modify or tune the behavior of thresholding module 318, adaptive polling module 320, filtering module 322, aggregation module 324, correlation module 326, and learning module 328 as required for a particular solution.

The thresholding module 318 and adaptive polling module 320 determine what data is collected. The filtering module 322, aggregation module 324 and correlation module 326 perform basic processing on data after the data is collected. Thresholding module 318 provides for creating and processing either simple or combined thresholding conditions. One or more of the collector blades 310 specify thresholds in terms of variables or events. If thresholding module 318 determines that the collected performance or accounting data has crossed a defined threshold, then one or more performance messages are created and sent to one or more external applications. The thresholds defined by the collector blades 310 may refer to variables representing a given parameter, e.g., delay, or a collection of events that may occur at the component level, e.g., a set of state transitions.

Filtering module 322 can filter any type of collected data based on prescribed conditions. These conditions may trigger sending an event or a data item to an external event bus, application, or system. Filters may be installed and set at run time through an enabling service. Further, at run time filtering conditions on the existing filters can be re-set. However, it is advisable not to change filtering conditions during a collection cycle, if proper data correlation is desired.

As a basic feature, a native filtering policy-blade is provided as part of policy blades 308. The native filtering policy blade filters data based on a combination of criteria that are derived from features carried by the collected information. For advanced filtering, special algorithms are applied to distinctly interpret the collected data based on the role a given network element has in a given context. For example, information collected from network elements that are serving a mission-critical application may receive different advanced filtering than data collected from core routers that are not associated with mission-critical applications.

Aggregation module 324 provides data aggregation for designated types of data, e.g., between call legs. Other types of correlation may be established by configuring one or more policy blades to define the aggregation types. In one embodiment, if aggregation module 324 determines that it is missing information needed to finalize a given aggregation pattern, the aggregation module can request the adaptive polling module 320 to initiate a polled data request to obtain the missing information. Aggregation module 324 may perform aggregation based on similarity of collected variables, or between requests having common or overlapping targets. Aggregation module 324 may perform aggregation as a simple concatenation of like data values, or as a complex aggregation in which redundant data, or data out of a given context, is pruned. Values defining what is pruned and when to prune it are determined according to a context in which information has been collected.

Correlation module 326 may correlate data from different sources that relate to a particular performance context, e.g., voice. In another embodiment, correlation module 326 correlates performance data with data associated with other network management functions, such as fault, configuration, accounting, or security. To achieve such cross-functional correlation, the performance engine interacts with other network management components, and/or issues requests for particular missing data, to perform a requested correlation.

Adaptive polling module 320 provides adaptive and optimized polling for values that are stored in MIBs of network elements of the managed network, or stored in other network sources. Interfaces 302 of performance engine 104 may be used to set a general polling frequency value that determines how often the polling module requests values from network elements.

Further, adaptive polling module 320 provides enhanced accuracy of collected data by self-adapting its polling frequency. With self-adaptive polling, adaptive polling module 320 changes the polling frequency according to how often data values of network elements change, based on evaluating changes in data that is actually collected. In one embodiment, adaptive polling module 320 receives information defining the CPU impact of changed polling rates, and such information is considered before a change in polling rate is made. In this way, adaptive polling does not result in overloading a particular network element with an unreasonable number of polling requests.

Further, dependencies among polled variables are considered. In still another embodiment, adaptive polling module 320 also considers the type of collector-blades and the settings that are used for collection. For example, target polled components are dynamically classified, and the polling frequency is then determined by particular dependencies among network components. A native policy-blade stored as part of policy blades 308 defines polling patterns for collecting information, e.g., at the same interval of a day, at a given time, or when a particular network parameter exceeds a given threshold.

In still another embodiment, adaptive polling module 320 determines an optimized polling frequency for use with particular classes of target variables. Thus, the optimized polling frequency for a particular class of target variables may indicate that values for such variables are not polled even when the adaptive polling module 320 has determined that it needs to poll a particular network element for other target variables. This feature helps the adaptive polling module 320 collect values for only those variables that have meaningful values at the time that a poll operation is performed.

The performance engine 104 has self-management functions that are implemented in the policy-kernel 304. The policy kernel 304 primarily performs services to keep track and update the structure and behavior of the performance engine 104. Generally, policy kernel 304 functions to manage performance engine 104 through one or more native policies, and to manage interaction with the environment through collector-blades and policy blades. The policy kernel 304 also handles or processes normalized events arriving through the functional interface. In one embodiment, policy kernel 304 performs the following interactions with other systems and elements: Automatic deployment of components of performance engine 104, including automatic deployment of policy-blades and automatic deployment of collector-blades; interactions with other components of OSS 108, including interactions with the policy engines inside devices of managed network 102 to harmonize data collection; activation, integration and importing of native structure policies, functional policies, and peer-interaction-blades.

Further, in an embodiment, the functions of the policy-kernel 304 are: performing an inventory of policy-access points; performing an inventory (registration/withdraw) of a system view; controlling access for external policy systems via policy-access points; processing a request for exception handling external policy systems (automatic, network operator); processing a request for correlation policy systems; and handling policy-access points including inventory, status, connection with external management policy-based systems, etc., the creation of new policy-access points, and temporary invalidation of a policy-access point. Policy kernel 304 may also function to control the configuration of the operational system (components and their interactions), including system enhancements (services, components, users, etc.), capture behavioral exceptions and assign appropriate external policies systems to them; and trade the most suitable external policy-based management system based on the type of view and behavioral exception.

In one embodiment, exceptions are specified in external policies and are incorporated into performance engine 104 by importing policy-blades. The policy kernel 304 decides what kind of policy-blade or policy system is enabled as imported policy (or policy system) at a given policy-access point. For example, in one approach, the policy kernel first enables those policy-access points corresponding to the external policy-based management systems. If the policy kernel captures a behavior that can be handled via native policies, there is no need to consider the policy-access points. If not, based on filtering criteria considering system views, the policy kernel selects a policy-access point and makes active the corresponding policy-based management system(s). According to the type of activated policy-based management systems, the policy kernel activates the appropriate policy correlation system.

A decisional interface in interfaces 302 allows policies to be created in the policy kernel 304 and retrieved from it; the decisional interface is also used to invalidate existing rules or add new rules. As an example, as part of adding a new collector blade to collector blades 310, decisional interface is used to update an inventory database 306 of the performance engine 104, and to update the filtering module 322 and aggregation module 324. The inventory database 306 comprises an inventory of all components of the performance engine 104 and other systems with which it inter-operates.

The performance engine 104 may receive collected data from managed network 102 through interfaces 302 in the form of a bulk File Transfer Protocol (FTP) upload, network response data from agents installed in network elements of the managed network, and RADIUS call data from access control servers or other devices. Further, performance engine 104 may poll network elements in the managed network 102 for specific values, such as SNMP variable values. Policy kernel 304 processes response data, correlates call record data and transparently passes the processed data to one or more upstream fault processing applications through interfaces 302. Correlated call record data is passed through interfaces 302 either via bulk FTP transfers or in XML format to an upstream reporting application.

Repository 312 provides a transient record for information that is continuously processed, and also serves as repository for native policies. In one embodiment, performance engine 104 does not use a persistent data store, but rather relies on upstream applications for storage of historical data. When inter-operating with a large managed network, performance engine 104 stores approximately 1-2 days of unprocessed and processed data in repository 312. The repository may be periodically purged to remove excess stored data, and a network operator wishing to retain more than 1 or 2 days data can configure an export function to store the data in a separate storage server.

An advanced information-processing module 330 enables performance engine 104 to perform context filtering, context aggregation, and processing partial information. In one embodiment, using advanced information-processing module 330 the collected data is tagged with the context in which it is gathered, and that context is provided to the filtering module 322 and aggregation module 324 for use in performing filtering and aggregation functions. A special function dedicated to processing partial information assumes entries in the form of patterns. A special entry module evaluates the degree of difference, or distance, of gathered data versus the closest pattern, and issues potential candidates for completeness, or triggers collection of additional information, based on the identified degree of difference. Further, a learning module 328 provides special performance and accounting related functions requiring the performance engine 104 to adapt or learn from partial data and sporadic information that does not fit an expected frequency of creation. One or more of the policy blades 308 may drive the operation of learning module 328.

3.4 Use of Dynamically Installed Policies to Control Performance and Accounting Data Collection As an example of the functions defined in the policy blades 308, a diagnostic policy-blade may be used in on-line diagnostic services. In general, a policy blade defines one or more incoming or spontaneous events that the performance engine 104 may detect in collected data, defines one or more solicited or polled events that the performance engine may request from network elements in the managed network, defines how to determine whether the events represent symptoms, and what to do in response. Thus, in one embodiment, events $[e_1]$ can be either spontaneous or collected, and three types of mechanisms to identify a symptom are identified:

1. Reactive: $S1=\{e_1\} \rightarrow P1$
2. Proactive: $[S1=\{e_1\}] \rightarrow$ alert P1
3. Pre-emptive: [poll S1 for $\{e_1, e_2\}$]$\rightarrow$alert all Pi triggered by $\{e_1, e_2\}$ The reactive approach identifies a problem P1 based on a particular event $e_1$ that is received from the managed network.

The proactive approach expresses that, while a symptom S1 is possible based on the already collected information, the arrival of $e_1$ should activate a process to infer a problem P1. With the same event suite root, the arrival of a different event, say $e_3$, will trigger another problem P3. The pre-emptive approach uses a polling procedure for particular events of interest or for a particular problem of interest. As an immediate application of these modes, advanced cooperation between intrusion detection systems and firewalls may be based on this paradigm.

The use of policies provides a method and a system for customizable data collection and data processing that can perform according to dynamically downloaded and on-demand activated policies. In one embodiment, a policy is a mechanism to define collection and processing of performance or/and account network information through a set of dynamically customizable collectors. A policy may also assist data collection, in case of failure, heavy traffic, or unfound specified data sources. A policy blade is a set of policies clustered for a given target. Similarly, a collector blade is a set of collection intended for a particular domain or type of data. A blade is a unit of installation, activation, or clearing.

When a policy-blade is activated, the consistency of a collector blade serving the purpose of data collection is first validated; dependency of policies may require deactivation of certain collectors, as polices may conflict as well. An example of a dependency, in the case of a virtual private network (VPN) billing policy-blade, is between an accounting-related policy and a performance-related policy that respectively define collection of data from the MPLS VPN MIB and the CB-QOS MIB. A single policy cannot deliver all the expected data. An example of policy conflict is when two policies identify the same collector and attempt to set inconsistent parameter values.

According to one embodiment, when performance engine 104 initiates operation, the performance engine loads a set of one or more policy blades defining native policies, collector blades and associations of policies and collectors. At runtime after initialization, performance engine 104 can import policies and integrate them with the native policies. In one embodiment, the import and integration process involves the following steps. First, a dependency check is performed to identify dependencies of the new policy with other policies that are then-currently active in the performance engine 104. Second, a conflict check is performed to determine whether the new policy attempts to set parameter values in a way that is inconsistent or conflicting with the parameter values set by existing active policies. Third, a compatibility check is performed to determine that all active policies are compatible with the data collectors specified in collector blades 310. Fourth, one or more new data collectors are downloaded from external storage based on the specification of the newly downloaded policy. Finally, a peering association is created between a performance collector and an accounting collector, based on their respective policies types. Specific collectors are required for particularly defined MIBs, where the navigation for collecting data is driven by the design of the MIBs. Therefore, the collectors must be aware of the details of the MIBs' design to collect accurate information. Peering associations are needed to perform an audit process, especially during the SLA violations or exceeded outages, to prove that a particular policy-blade used appropriate collectors. In these cases, collection and processing are handled based on the peering associations. After policy post-conditions are validated, the policy peering associations are saved for the audit process.

The approaches of certain embodiments described herein offer numerous distinct advantages over prior approaches. For example, assume that two data collectors C1 (p1, p2, p3) and C2 (q1, q2, q3) are defined, for collecting data relating to parameters $p_i$ and $q_j$, respectively. In existing systems, a built-in rule can be used to specify the fact that:

IF p2 of C1>xx % AND q3 of C2<[REAL] THEN DO <action>

This simply allows providing basic coordination among statically built-in parameterized collectors. The compatibility between C1 and C2 is statically validated, at the design phase, and the pre-conditions for an action are driven only by the relationship among the parameters. All collectors are forever activated; they are statically defined.

In the present approach, a collector library than can be activated by request according to the active policies. Assume that the set of collectors is $C_{ij}=\{C_i(w_{i1}, w_{i2}, \ldots w_{ij})\}$. A collector manager, which is a component of the policy-kernel 304 that is dedicated to handle collector related activities, maintains an inventory and locations of collectors that may be potentially used. Thus, various collectors may be stored anywhere in the Internet and downloaded by request, under license or without compensation. Further assume that the network includes a policy server that can be dynamically updated with a set of policies $P_{lk}=\{P_{l1}, P_{l2}, P_{l3}, \ldots P_{lk}\}$, where each policy prescribes a set of collectors and a set of actions triggered upon interpreting the collected data. Therefore a policy $P_{nm}$ may be defined as a set of collectors, $C_{ij}$, a set of rules peering collectors to actions, $R_{st}$, a set of actions, $A_k$, a set of conflicting policies, $P_{ab}$, and a set of policies required to be active when $P_{nm}$ is active, $P_{cd}$. Therefore $P_{nm}(\{C_{ij}\}, \{R_{st}\}, \{A_k\}, \{P_{ab}\}, \{P_{cd}\})$.

In the present approach, a real-time peering association is maintained between a set of policies and a set of collectors. In the above case, all collectors prescribed by $\{P_{ab}\}$ must be disabled, and all collectors prescribed by $\{P_{cd}\}$ must be enabled. In the case when some collectors belonging to $\{C_{ij}\}$ or specified by $\{P_{cd}\}$ are not in the system, as determined by checking the collector inventory, the collector manager downloads and installs the collectors that are missing. If a particular collector is not defined, then an error is signaled, and the triggered policy is suspended.

The performance engine 104 performs policy checking for conflicts, or for companion policies whenever a new policy is downloaded into the performance engine. However, collector checking is performed only when a particular policy is activated.

The use of policy blades and collector blades creates opportunities for a vendor of the performance engine 104 to generate revenue from licensing copies of policy blades and collector blades to its customers. Thus, a customer who has installed the performance engine 104 can invoke and download a particular collector and/or policy in consideration for appropriate compensation.

3.5 Implementation of Policies as Managed Objects

According to one embodiment, policies are represented in policy kernel 304 as managed objects using an object-oriented programming environment. Performance and accounting policies are derived from goals specified at a high level of a policy hierarchy, or with respect to the current state of the managed system.

Policy behaviors are encapsulated as behaviors of policy objects, and other policy properties are specified in policy objects, as described in the example schema Policy in Table 1 below. The attribute derivedFrom specifies a link to the goals leading to a given policy. The schema Policy specifies policy properties without any policy behavior. Consequently, no instances of the Policy schema are created in policy kernel 304; thus, the Policy schema is similar to an abstract class as allowed in certain object-oriented programming languages.

TABLE 1

POLICY SCHEMA EXAMPLE
Policy domains: P DomainIdentifier
lifeTime: LifeTime
targets: P EMObjects
subjects: P EM Objects
    companion policies, as required by the policy behavior
refinementStatus: RefinementStatus
administrativeState: PolicyAdministrativeState
priority: 1..maxPriority
derivedFrom: P Goal
    invariant
priority $\geq$ max {goal.priority • $\forall$ goal $\in$ derivedFrom}
    different policy behaviors may be specified by specialization of this schema The representation of policies as objects allows performance engine 104 to combine policy properties with policy behaviors.

According to one embodiment, most common policies are daemon-based. In a daemon-based policy, when an activation condition is satisfied, an action leading to one or more policy post-conditions is performed. The action is not visible; it is automatically and internally triggered. Policies may also have dependencies or other pre-conditions. Examples of pre-conditions include a particular required status for target network elements; other policies that must be installed or run first (a dependency on another policy); the presence in the network of a particular target network element; and others.

As an example, a polling policy could be frequently used for performance purposes. A managing object may apply this policy with a fixed polling frequency, or with a variable polling frequency that may be adapted with respect to the state evolution of concerned managed objects. In the latter case, a companion policy is assumed to dynamically adapt the polling frequency. The schema PollingPolicy set forth in Table 2 below has an invisible operation called DaemonPolling, which performs the polling with a given polling frequency, and a companion policy called ActivateFrequencyChange1. The attribute pollingFrequency represents the value of the polling frequency currently in use. The counter attribute simulates the general system clock. The value of the counter attribute represents the absolute time, and the real-time clock dynamically updates the counter attribute. Informally, the polling policy is applied by a managing object, which records, within an object of type Log, various current information of managed objects under its jurisdiction and processes this information for management purposes. In the example below, a logs attribute is assumed to exist in which the performance engine 104 stores this information for each managed object.

The operation DaemonPolling is applied for each managed object that is among the targets of the policy. When the activation condition is satisfied, the current usage state value corresponding to the polled object is stored in the logs. In this example, the content of logs is a set of tuples of type Tuple, defined as:

Tuple::={(timestamp, object, state)|timestamp: R, object: EMObject, state: UsState}
R: Real
UsState: Usage State EMObject: Managed Object
x?: represents an input for a function
mView: represents the management view of a behavior
logs'=logs_ {(counter, o?, o?.mView.usState)} means that the existing logs are completed with a new value; the result is noted now log'.

TABLE 2

POLLING POLICY SCHEMA EXAMPLE

| PollingPolicy | |
|---|---|
| 1 (pollingFrequency logs) | pollingFequency is visible since it may be modified by the companion policy; the content oflogs may be processed by a managing object |
| Policy pollingFrequency:R | |
| companion: ActivateFrequencyChange1 | used to modify the polling frequency |
| counter: Counter | used to measure the time |
| logs: set of Tuple | declares thelogs, where the information collected from the managed objects is stored |
| DaemonPolling | |
| o?: EMObject assume(precond) o?∈ targets ∧ o?.allObjects ∈ domains ∧ administrativeState = unlocked ∧ companion.administrativeState = unlocked when(activation condition) ∃ i: N • counter = ix [pollingFrequency$^{-1}$] the notation [a] represents the integer value of a. ensure (postcond) logs' = logs ∪ {(counter, o?, o?.mView.usState)} | |

Various policies may be used to calculate a flexible polling frequency. In one approach, the polling frequency is adapted according to the real performance state of managed objects. The PollingPolicy is a companion policy of these policies.

As an example, assume that the predicate $p(t) < p_0$ is an activation condition of a policy ActivateFrequencyChange1 that adapts the polling frequency when the performance p(t), represented by the attribute realPerformance, is under a given threshold $p_0$, according to a function f defined as f: $[0, 1] \to R$. The value $p_0$ is a threshold of the performance defined by the management system for those system components playing critical roles for particular applications, such a utility data center, a server CPU, an operating system, or a host playing the role of management station.

In the following schema, the operation called DaemonAction1 is not visible at the interface of the ActivateFrequencyChange1 schema. When the activation condition is satisfied, a new value for the polling frequency is computed, if the properties of the policy are satisfied, as specified by the schema Policy. For example, the managed object must belong to the specified target, within the specified domain, whereas the policy object is not prohibited for use and the asynchronous triggering is allowed. In Table 3 below, the expression mo?.mView. realPerformance is using the "dot" semantic, i.e., the value of realPerformance, of the managed view [mView], of the managed object [mo], which is input of the function f. The "delta" sign represents the entities that are changed due to a particular action (in the example, the polling frequency of the companion policy, which is an instance of the type PollingPolicy).

TABLE 3

POLICY WITH ACTION

| ActivateFrequencyChange1 | |
|---|---|
| Policy companion: PollingPolicy $p_0$: Performance | critical value between [0, 1] |
| DaemonAction1 | |
| Δ (companion.pollingFrequency) mo?: EMObject assume (precond) mo?∈ targets ∧ mo?.allObjects ∈ domains ∧ administrativeState = unlocked ∧ companion.administrativeState = unlocked when (activation condition) mo?.mView. realPerformance < $p_0$ ensure (postcond) companion.pollingFrequency' = f (mo?.mView. realPerformance) | the attribute realPerformance represents the measured performance |

3.6 Implementation Example

According to one embodiment, performance engine 104 collects data for a plurality of network elements in a service provider network. Collection is performed for each interface of each network element, and for each sub-interface or logical interface (e.g., VC, VP, PWE3, VLAN, Tunnel, MPLS, ATM), and for each VPN connection. Performance engine 104 performs aggregation of statistical data that is collected for each interface without regard to sub-interfaces, logical interfaces, services, etc., on the interface, per class of service on an interface irrespective of service, VC, tunnel, flows, etc., and by summing of ingress/egress traffic of all sites of a VPN. Collection can be activated or deactivated under various conditions in the network.

In this embodiment, when deployed in a network that includes network elements from Cisco Systems, Inc., San Jose, Calif., data is collected from a Cisco NetFlow component deployed at each network element, and also from certain SNMP MIBs, such as the interface (IF) MIB, MPLS VPN MIB, and CISCO-CLASS-BASED-QOS (CB-QOS or MQC) MIB.

A first collection probe is defined to collect interface statistics of an interface on which a VPN Routing Forwarding (VRF) table is configured. The interface statistics are correlated with the VRF so that they are associated with one site of a VPN. The performance engine 104 also collects statistics of the routes that are added to the VRF table, and PD class of service (CoS) traffic into the VPN and what percentage of PD traffic is WRED dropped. In order to collect these statistics, two key variable values are needed: the interface index (ifIndex) and name of a VRF. The MIB objects shown in Table 4 are obtained:

TABLE 4

MIBS AND MIB OBJECTS FOR COLLECTION

MIB: IF MIB
Objects:
    ifInOctets.
MIB: MPLS VPN MIB
Objects:
    mplsVpnVrfPerfRoutesAdded of mplsVpnVrfPerfTable
MIB: CB-QOS MIB

TABLE 4-continued

MIBS AND MIB OBJECTS FOR COLLECTION

Objects:
    cbQosCMPostPolicyByte64 of cbQoSCMStatsTable: count of
        outbound octets after the execution of QoS policy.
        cbQosREDTransmitByte64 of cbQosREDClassStatsTable
    cbQosREDTailDropByte64 of cbQosREDClassStatsTable: The 64
        bits count of bytes dropped when the number of packets in
        the associated queue was greater than the maximum threshold.
    CbQosREDRandomDropByte of cbQosREDClassStatsTable: The 64
        bits count of bytes dropped when the number of packets in the
        associated queue was greater than the minimum threshold and
        less than the maximum threshold.

To correlate ifInOctets statistics collected from the IF MIB, performance engine 104 requires the ifIndex from mplsVpnIfConfTable of VPN MIB, which is the mplsVpnIfConfIndex object of the table. The mplsVpnIfConfIndex is extracted by searching the table on mplsVpnVrfName. This approach assumes that the mplsVpnIfConfTable is uploaded into the NMS. Hence mplsVpnVrfName to ifIndex mapping can be done readily.

The CB-QOS MIB is a complex MIB with many tables. To identify the appropriate cbQosCMPostPolicyByte64 entry, the performance engine 104 needs to traverse a number of tables. Given if Index or ATM VPI/VCI and class-map name "PD" as input, the performance engine 104 traverses the tables to reach the relevant cbQosCMPostPolicyByte64 object. The performance engine 104 assumes that the configuration tables of CB-QOS MIBs have been uploaded to the performance engine. If this assumption holds, then the performance engine 104 can use the following steps to find the appropriate cbQosCMPostPolicyByte64 object.

First, the cbQosServicePolicyTable is searched on the ifIndex column, or AtmVPI and AtmVCI, which yields a PolicyIndex value (V1). Columns in the cbQosServicePolicyTable comprise PolicyIndex, PolicyDirection, IfType, IfIndex, FrDLCI, AtmVpi, and AtmVci.

Second, the cbQosCMCfgTable is searched on CMName="PD" yielding a ConfigIndex value (V2). Columns in the cbQosCMCfgTable comprise ConfigIndex, CMName, CMDesc, and CMInfo.

Third, the cbQosObjectsTable is searched on V1 and V2, which will yield an ObjectsIndex value (V3). Columns in the cbQosObjectsTable comprise PolicyIndex, ObjectsIndex, ConfigIndex, ObjectsType, and parentObjectIndex.

Fourth, the CbQosCMStatsTable is searched on V1 and V3, which yields an appropriate value of cbQoSCMPostPolicyByte64. Columns in the CbQosCMStatsTable comprise PolicyIndex, ObjectsIndex, and cbQoSCMPostPolicyByte64.

Figure 4:
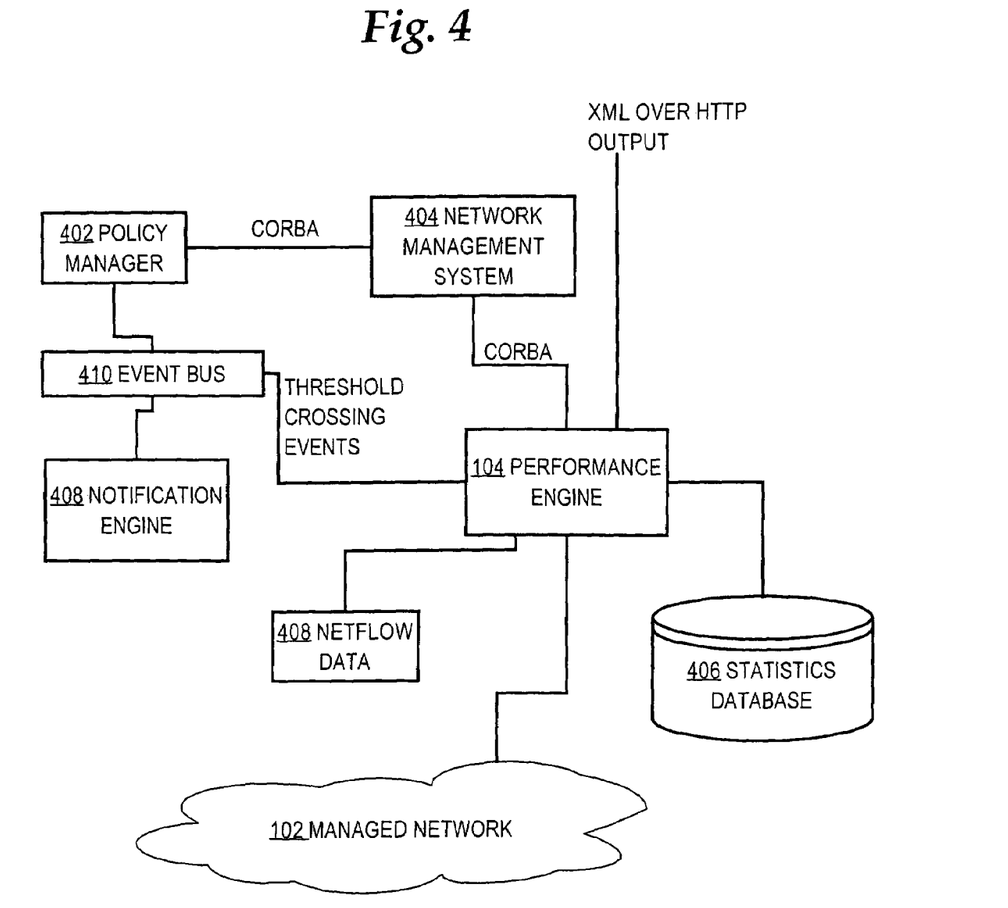
FIG. 4 is a block diagram showing the communication of a performance engine with other elements of an OSS and related network management functional modules.

FIG. 4 is a block diagram showing the communication of performance engine 104 with other elements of an OSS and related network management functional modules. The performance engine 104 is communicatively coupled with a network management system 404. In one embodiment, network management system 404 is Cisco IP Solution Center from Cisco Systems. The performance engine interfaces with network management system 404 to provide MPLS VPN aware data collection. For example, performance engine 104 collects raw statistics information for an interface over which a VRF is configured using, for example, NetFlow data 408 obtained from managed network 102 using the Cisco NetFlow system. Because NetFlow data is not VRF-aware, performance engine 104 associates NetFlow interface statistics with a VPN site by communicating with network management system 404 using an association based on ifIndex value.

The performance engine 104 may store the resulting statistics in a statistics database 406 with values representing a customer, site and device. Such values are obtained from the network management system using an API.

As shown in FIG. 4, the performance engine 104 also interfaces with a policy manager 402 through an event bus 410 to provide performance threshold crossing events. A notification engine 408 or other listener may be communicatively coupled to event bus 410 for the purpose of generating notification events or messages, such as e-mails, pages, etc., in response to threshold crossing events that the performance engine 104 publishes to the event bus. The policy manager 402 is communicatively coupled to network management system 404 and can indirectly specify policy to the performance engine 104. Further, performance engine 104 can output statistics information in XML over HTTP format to external systems such as other OSS components.

A system with this architecture may provide collection control that is aware of the topology and services provided in the managed network. For example, a second data collection probe may be defined as follows. All the statistics in the first probe defined above are collected for a VPN, that is, for all the related points of a VPN. Full topology knowledge is required to collect these statistics. An MPLS L3 VPN may have multiple sites with any-to-any, hub-and-spoke, or other form of topology. Hence collection of statistics for a VPN may translate into the following collection sub-tasks: collection for each site; collection for each site pair; and collection at all points or sites in the VPN. The knowledge of topology is required in order to set or deactivate collection probes at appropriate points of a multi-site MPLS VPN. Collection can also be controlled based on fault notification.

4.0 IMPLEMENTATION MECHANISMS

Hardware Overview

Figure 5:
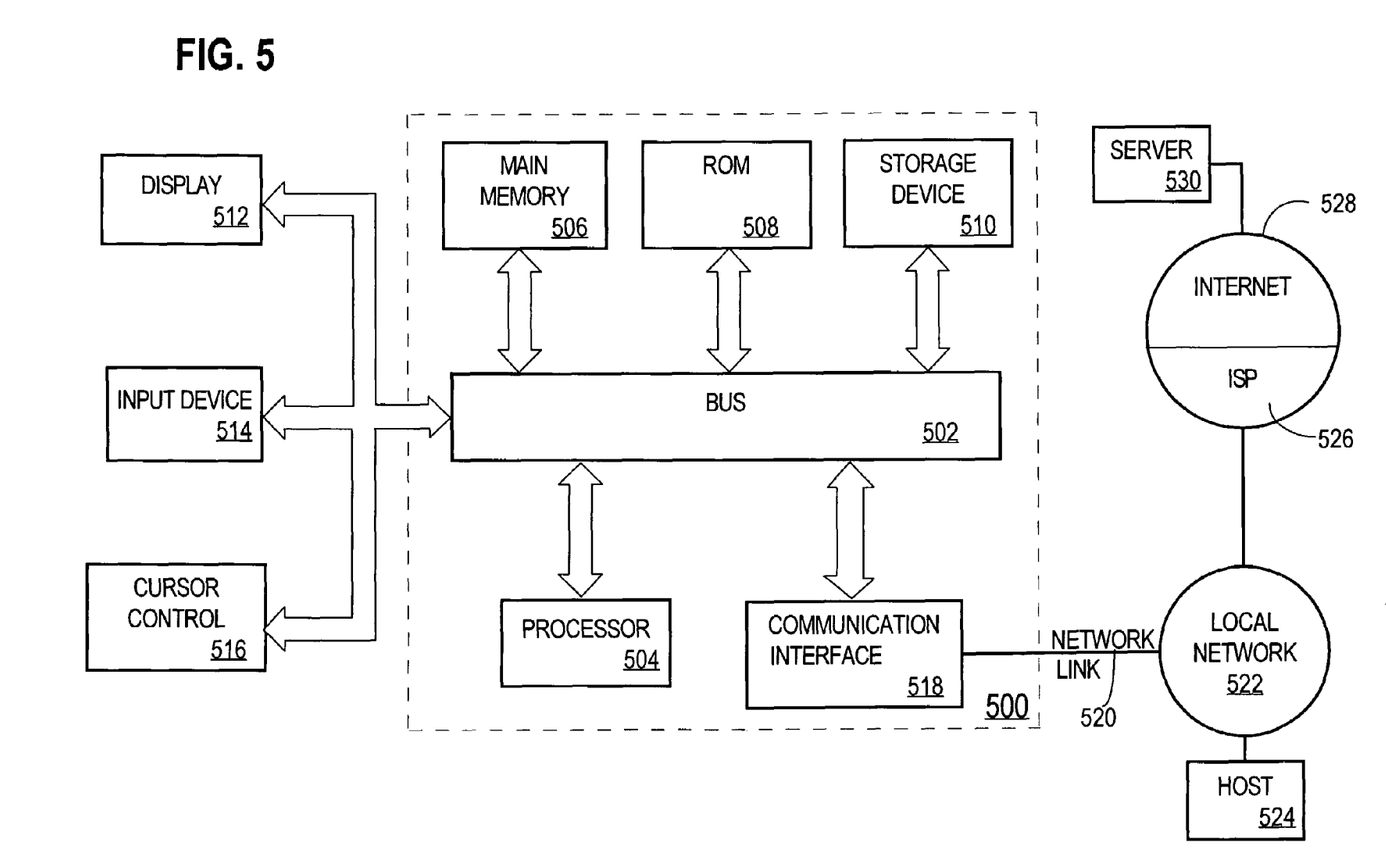
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for managing performance data and accounting data that are generated in a computer network. According to one embodiment of the invention, managing performance data and accounting data that are generated in a computer network is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for managing performance data and accounting data that are generated in a computer network as described herein.

The received code may be executed by processor 504 as it is received, and/or stored in storage device 510, or other non-volatile storage for later execution. In this manner, computer system 500 may obtain application code in the form of a carrier wave.

5.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of managing performance data and accounting data that are generated in a computer network, the method comprising the computer-implemented steps of:
    collecting performance data from the network using one or more collector blades that are dynamically installed into a data collection manager when the data collection manager is executing;
    wherein collecting performance data comprises polling one or more network elements in the network to obtain the performance data, according to an adaptive polling frequency, wherein the adaptive polling frequency is determined based on one or more rates of change in the performance data, wherein the rates of change are determined based on one or more dependencies among components of the network elements;
    wherein the collector blades comprise information identifying a source of the performance data, frequency of collection from that source, destination to send the performance data when it is collected, and a type of processing to be performed on the performance data;

determining whether the performance data satisfies one or more thresholding rules, and if so, generating and sending one or more performance messages;

filtering the performance data using one or more filters;

aggregating the performance data;

wherein aggregating the performance data comprises determining whether information needed to finalize a specified aggregation pattern is missing and, if needed information is missing, polling one or more network elements in the network to obtain missing information needed to finalize the specified aggregation pattern;

correlating the performance data with other data received from one or more network management subsystems; and determining whether at least one of the collector blades is unnecessary, and if so, deactivating that collector blade without disabling the data collection manager.

2. The method of claim 1, wherein the collector blades specify thresholds in terms of variables or a collection of events.

3. The method of claim 2, wherein the variables comprise a delay parameter.

4. The method of claim 2, wherein the collection of events comprises a set of state transitions.

5. A method as recited in claim 1, wherein the thresholding rules, filtering, aggregating, and correlating are performed according to one or more policies that are installed into the data collection manager at a time when the data collection manager is executed.

6. The method of claim 5, further comprising:

running the correlation policies in a decisional space also occupied by the performance data collector and accounting data collector.

7. A method as recited in claim 1, wherein one or more of the collector blades comprise generic management information base (MIB) collectors that collect performance data, and one or more of the collector blades are specialized collectors.

8. A method as recited in claim 1, further comprising the steps of:

providing a collector blade interface in the data collection manager;

receiving information identifying one or more collector blades;

determining a collector type associated with each of the collector blades.

9. A method as recited in claim 1, wherein each of the thresholding rules specifies a condition associated with a variable for either a particular data parameter or a set of events that may occur among components of elements of the networks.

10. A method as recited in claim 1, wherein the filters are installed into the data collection manager at the time when the data collection manager is executed.

11. A method as recited in claim 1, wherein aggregation further comprises the steps of:

determining a context associated with the performance data;

removing data that is redundant or not germane to a specified context.

12. A method as recited in claim 1, wherein the network management subsystems comprise performance, fault, accounting, or security subsystems.

13. The method of claim 1, wherein the collector blades are dynamically extensible.

14. The method of claim 1, wherein the collector blades are installed at run-time.

15. The method of claim 1, wherein the collector blades are generic and configured to collect data held in tables and object groups that are all similarly accessible.

16. The method of claim 1, wherein the collector blades are specialized and configured to collect data held in tables and object groups that have internal dependencies.

17. The method of claim 1, wherein the collector blades are tailored and configured to collect data held in tables and object groups that have specific operational support system (OSS) components.

18. The method claim 1, wherein the collector blades are tailored and configured to collect data held in other networks.

19. The method of claim 1, further comprising:

a vendor generating revenue from licensing copies of the policy blades and collector blades to a plurality of vendor customers.

20. The method of claim 1, further comprising:

activating and deactivating one or more of the collector blades depending on changes to the topology of the network.

21. A system for managing and storing performance data and accounting data that are generated and stored within a computer network, the system comprising:

one or more collector blades that collect performance data from the network and that are installed into a data collection manager at a time when the data collection manager is executed;

a polling module configured to poll one or more network elements in the network to obtain the performance data, according to an adaptive polling frequency, wherein the adaptive polling frequency is determined based on one or more rates of change in the performance data, wherein the rates of change are determined based on one or more dependencies among components of the network elements;

wherein the collector blades comprise information identifying a source of the performance data, frequency of collection from that source, destination to send the performance data when it is collected, and a type of processing to be performed on the performance data;

a thresholding module that determines whether the performance data satisfies one or more thresholding rules, and if so, generates and sends one or more performance messages;

a filtering module comprising one or more filters for filtering the performance data;

an aggregation module configured for aggregating the performance data;

wherein the aggregation module determines whether information needed to finalize a specified aggregation pattern is missing and, if needed information is missing, initiates polling of one or more network elements in the network to obtain missing information needed to finalize the specified aggregation pattern;

a correlation module configured for correlating the performance data with other data received from one or more network management subsystems; and a policy kernel coupled to the collector blades, thresholding module, filtering module, aggregation module, and correlation module, wherein the policy kernel comprises one or more policies that are installed into the data collection manager at a time when the data collection manager is executed, wherein the thresholding rules, filtering, aggregating, and correlating are performed according to the policies;

wherein the system determines whether at least one of the collector blades is unnecessary, and if so, deactivating that collector blade without disabling the data collection manager.

22. The system of claim 21, further comprising:
a performance engine collecting, aggregating, and forwarding performance and usage data from a plurality of network element types and data sources comprising MIBs, bulk MIB files, flat files, call history detail records, according to policies that are programmed into the performance engine by higher-layer applications.

23. The system of claim 21, wherein the policy kernel handles or processes normalized events arriving through a functional interface.

24. The system of claim 21, further comprising:
wherein the policy kernel performs the following interactions with other systems and elements: automatic deployment of components of performance engine including automatic deployment of policy-blades and automatic deployment of collector-blades; interactions with other components of operational support system (OSS), including interactions with the policy engines inside devices of managed network to harmonize data collection; activation, integration and importing of native structure policies, functional policies, and peer-interaction-blades.

25. The system of claim 21, wherein the policy kernel performs an inventory of policy-access points; performs an inventory (registration/withdraw) of a system view; controls access for external policy systems via policy-access points; processes a request for exception handling external policy systems; processes a request for correlation policy systems; and handles policy-access points including inventory, status, connection with external management policy-based systems, the creation of new policy-access points, and temporary invalidation of a policy-access point.

26. The system of claim 21, wherein the policy kernel controls the configuration of the system including system enhancements, captures behavioral exceptions and assign appropriate external policies systems to the system; and determines an external policy-based management system based on the type of view and behavioral exception.

27. The system of claim 21, wherein the policy kernel decides what kind of policy-blade or policy system is enabled based on imported policy at a specific policy-access point.

28. The system of claim 21, wherein the policy kernel further comprises a collector manager.

29. An apparatus for managing and storing performance data and accounting data that are generated and stored within a computer network, the apparatus comprising:
means for collecting performance data from the network using one or more collector blades that are installed into a data collection manager at a time when the data collection manager is executed;
means for polling one or more network elements in the network to obtain the performance data, according to an adaptive polling frequency, wherein the adaptive polling frequency is determined based on one or more rates of change in the performance data, wherein the rates of change are determined based on one or more dependencies among components of the network elements;
wherein the collector blades comprise information identifying a source of the performance data, frequency of collection from that source, destination to send the performance data when it is collected, and a type of processing to be performed on the performance data;
means for determining whether the performance data satisfies one or more thresholding rules, and if so, generating and sending one or more performance messages;
means for filtering the performance data using one or more filters;
means for aggregating the performance data; and
means for correlating the performance data with other data received from one or more network management subsystems;
wherein aggregating the performance data comprises determining whether information needed to finalize a specified aggregation pattern is missing and, if needed information is missing, polling one or more network elements in the network to obtain missing information needed to finalize the specified aggregation pattern;
means for determining whether at least one of the collector blades is unnecessary, and if so, deactivating that collector blade without disabling the data collection manager.

30. A computer-readable volatile or non-volatile storage medium storing one or more sequences of instructions for managing performance data and accounting data that are generated in a computer network, which instructions, when executed by one or more processors, cause the one or more processors to perform the steps of:
collecting performance data from the network using one or more collector blades that are installed into a data collection manager at a time when the data collection manager is executed;
wherein collecting performance data comprises polling one or more network elements in the network to obtain the performance data, according to an adaptive polling frequency, wherein the adaptive polling frequency is determined based on one or more rates of change in the performance data, wherein the rates of change are determined based on one or more dependencies among components of the network elements;
wherein the collector blades comprise information identifying a source of the performance data, frequency of collection from that source, destination to send the performance data when it is collected, and a type of processing to be performed on the performance data;
determining whether the performance data satisfies one or more thresholding rules, and if so, generating and sending one or more performance messages;
filtering the performance data using one or more filters;
aggregating the performance data; and
correlating the performance data with other data received from one or more network management subsystems;
wherein aggregating the performance data comprises determining whether information needed to finalize a specified aggregation pattern is missing and, if needed information is missing, polling one or more network elements in the network to obtain missing information needed to finalize the specified aggregation pattern;
means for determining whether at least one of the collector blades is unnecessary, and if so, deactivating that collector blade without disabling the data collection manager.

* * * * *

UNITED STATES PATENT AND TRADEMARK OFFICE
CERTIFICATE OF CORRECTION

PATENT NO. : 7,606,895 B1
APPLICATION NO. : 10/900900
DATED : October 20, 2009
INVENTOR(S) : Dini et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1000 days.

Signed and Sealed this

Twelfth Day of October, 2010

David J. Kappos
*Director of the United States Patent and Trademark Office*